(12) United States Patent
Saito et al.

(10) Patent No.: US 6,241,956 B1
(45) Date of Patent: *Jun. 5, 2001

(54) GLASSY CARBON AND PROCESS FOR PRODUCTION THEREOF

(75) Inventors: Kazuo Saito; Takeshi Ishimatsu, both of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/051,926

(22) PCT Filed: Aug. 27, 1997

(86) PCT No.: PCT/JP97/02981

§ 371 Date: Apr. 23, 1998

§ 102(e) Date: Apr. 23, 1998

(87) PCT Pub. No.: WO98/08772

PCT Pub. Date: Mar. 5, 1998

(51) Int. Cl.[7] .................................................. C01B 31/02
(52) U.S. Cl. ....................................................... 423/445 R
(58) Field of Search .................. 423/445 R; 204/298.31; 365/33

(56) References Cited

U.S. PATENT DOCUMENTS 4,188,369 * 2/1980 Rautavuori et al. ............. 423/445 R 5,871,609 * 2/1999 Saito et al. ....................... 423/445 R

FOREIGN PATENT DOCUMENTS

| 64-24012 | 1/1989 | (JP) . |
| 7-277826 | 10/1995 | (JP) . |
| 64-292484 | 11/1995 | (JP) . |

* cited by examiner

*Primary Examiner*—Stuart Hendrickson
(74) *Attorney, Agent, or Firm*—Kubovcik & Kubovcik

(57) ABSTRACT

The glassy carbon according to the present invention is obtained by heat-curing a phenolic resin and firing the cured-phenolic resin in a non-oxidizing atmosphere, wherein the phenolic resin has a number-average molecular weight of 300–500 and is used in the form of a hydrophilic organic solvent solution containing 40–80% by weight of the phenolic resin; and the process comprises heat-curing a phenolic resin and firing the cured-phenolic resin in a non-oxidizing atmosphere, wherein the phenolic resin has a number-average molecular weight of 300–500 and is used in the form of a hydrophilic organic solvent solution containing 40–80% by weight of the phenolic resin. The glassy carbon of the present invention has no defects on the surface or inside and consequently contains no residual gas inside; and, when used particularly as a substrate for magnetic recording medium or as an electrode plate for plasma etching, does not make the magnetic recording layer non-uniform or does not substantially generate any fine dust.

18 Claims, No Drawings

GLASSY CARBON AND PROCESS FOR PRODUCTION THEREOF

This is a National Stage application of PCT/JP97/02981 filed Aug. 27, 1997.

TECHNICAL FIELD

The present invention relates to a glassy carbon and a process for producing it.

BACKGROUND ART

Glassy carbon has properties of carbon material, such as heat resistance, corrosion resistance and electrical conductivity; toughness, non-permeability to gases and very low dust-generating property, derived from the dense amorphous structure characteristic of glassy carbon; and a low specific gravity as compared with metal materials. Therefore, glassy carbon is in use, for example, as a substrate for magnetic recording medium or as a member of apparatus for semiconductor fabrication used in electronics industry.

As the substrate for magnetic recording medium, a substrate having less defects and higher accuracy has come to be required as the magnetic density of magnetic recording medium has become increasingly higher. With respect to the member of apparatus for semiconductor fabrication, generation of fine dust therefrom (which has not been a problem heretofore) has come to be taken up as a problem as the semiconductor integrated circuit has come to possess a higher density in recent years, that is, the linewidth has become finer; with respect to, in particular, the electrode plate used in plasma etching of semiconductor, an electrode plate has become necessary which generates dust in a smaller amount and in a finer size during etching.

Conventional glassy carbon used as a substrate for magnetic recording medium or as a member of apparatus for semiconductor fabrication, although having a dense amorphous structure and a very low dust-generating property, microscopically has, on the surface or inside, fine pores or low-density non-homogeneous portions (defects); as a result, a gas tends to remain inside the glassy carbon and, when a magnetic recording layer is formed on the glassy carbon, the above surface defects or the gas remaining inside has made the magnetic recording layer nonuniform locally. Also, when such glassy carbon is used as an electrode plate for plasma etching, the surface or inside defects have caused structural destruction owing to the abnormal discharging during etching and have become a source of fine dust generation.

The present invention has been completed with an aim of providing a glassy carbon which has no defects on the surface or inside and consequently contains no gas inside and which, when used particularly as a substrate for magnetic recording medium or as an electrode plate for plasma etching, does not make the magnetic recording layer nonuniform or does not substantially generate any fine dust; and a process for producing such a glassy carbon.

DISCLOSURE OF THE INVENTION

The glassy carbon employed in the present invention in order to achieve the above aim, is obtained by heat-curing a phenolic resin and firing the cured-phenolic resin in a non-oxidizing atmosphere, wherein the phenolic resin has a number-average molecular weight of 300–500 and is used in the form of a hydrophilic organic solvent solution containing 40–80% by weight of the phenolic resin. Also, the process for producing a glassy carbon, employed in the present invention in order to achieve the above aim, comprises heat-curing a phenolic resin and firing the cured-phenolic resin in a non-oxidizing atmosphere, wherein the phenolic resin has a number-average molecular weight of 300–500 and is used in the form of a hydrophilic organic solvent solution containing 40–80% by weight of the phenolic resin.

BEST MODE FOR CARRYING OUT THE INVENTION

The present invention is hereinafter described in detail.

As mentioned above, the glassy carbon of the present invention is obtained by heat-curing a phenolic resin and firing the cured-phenolic resin in a non-oxidizing atmosphere. As the phenolic resin used in the present invention, there can be used a phenolic resin soluble in a hydrophilic organic solvent. Specific examples thereof are a resol type phenolic resin and a novolac type phenolic resin. A resol type phenolic resin is preferred because of the high compatibility with a hydrophilic organic solvent, and a liquid resol type phenolic resin is most preferred.

The phenolic resin has a number-average molecular weight of preferably 300–500. When the number-average molecular weight is smaller than 300, the phenolic resin produces a large amount of water per unit weight during the curing, which tends to generate bubbles of water in the cured resin. When the number-average molecular weight is larger than 500, the phenolic resin gives a high viscosity when made into a phenolic resin solution as described later; the air taken into the phenolic resin solution when the solution is cast into a mold, is difficult to remove; as a result, the resulting glassy carbon tends to have defects.

The glassy carbon of the present invention is obtained from a solution of the phenolic resin. The solvent used in the phenolic resin solution is a hydrophilic organic solvent in order to uniformly disperse therein the water formed during the heat-curing of the phenolic resin.

The hydrophilic organic solvent can be exemplified by ethers such as tetrahydrofuran (THF), dioxane and the like; acid derivatives such as dimethylformamide (DMF), N,N-dimethylacetamide and the like; ketones such as acetone, methyl ethyl ketone and the like; nitriles such as acetonitrile, propionitrile and the like; alcohols such as methyl alcohol, ethyl alcohol, propyl alcohol, butyl alcohol, isobutyl alcohol, isopentyl alcohol, benzyl alcohol and the like; and phenols. Of these, preferred are those having a boiling point of 100° C. or less, because they are easily removed during the curing of the resin. Particularly preferred are lower alcohols having 1 to 5 carbon atoms, such as methyl alcohol, ethyl alcohol, n-propyl alcohol, isopropyl alcohol, n-butyl alcohol, sec-butyl alcohol and the like, because these solvents can give a resin solution of relatively low viscosity and yet high resin concentration. These hydrophilic organic solvents can be used in admixture of two or more kinds.

The resin concentration in the phenolic resin solution must be in the range of 40 to 80% by weight.

The phenolic resin solution has a viscosity at 25° C. of preferably 200–300 cp, more preferably 200–250 cp for easy handling during the curing of the phenolic resin and easy removal of the air bubbles taken into the solution. The phenolic resin solution can have a viscosity of the above range when produced by dissolving a phenolic resin having a number-average molecular weight of 300–500, in, for example, the above-mentioned alcohol at a concentration of 40–80% by weight.

However, for example, when the concentration of the phenolic resin is lower than 40% by weight, the amount of the solvent to be removed during the curing of the resin is large, making long the time for resin curing and inviting poor economy. When the resin concentration is higher than 80% by weight, the resulting phenolic resin solution has a viscosity of 300 cp or higher; the air incoming when the phenolic resin solution is cast into a mold, is not easily removed; as a result, the resulting glassy carbon tends to have defects.

The phenolic resin solution has a gelation time as measured at 150° C. by the hot plate method, of preferably 80–150 seconds, more preferably 100–130 seconds. When the gelation time is too short, the air incoming when the phenolic resin solution is cast into a mold, is not easily removed. When the gelation time is too long, the curing of the phenolic resin takes a long time, which is not economical.

It is not necessary to add a curing agent to the phenolic resin solution. Rather, addition of a curing agent or a curing accelerator is not preferred because the molecular structure of the cured resin tends to become nonuniform microscopically and the glassy carbon after firing has grain boundaries.

The glassy carbon of the present invention is produced from the above-mentioned phenolic resin solution as follows according to the production process of the present invention. First, the phenolic resin solution is as necessary filtered to remove the impurities contained therein. There is no particular restriction as to the method for filtration, but there can be mentioned, for example, pressure filtration using a 1–10 µm filter.

Then, the filtered phenolic resin solution is cast on, for example, a polyethylene terephthalate (PET) film, followed by heating in the range of 50–200° C. to cure the phenolic resin. Specifically, temperature elevation from 70 to 85° C. is conducted in 40 hours to cure the phenolic resin; the cured phenolic resin is released from the PET film and temperature elevation from 90 to 100° C. is conducted in 10 hours for further curing of the phenolic resin. Incidentally, at least the initial stage of heating is preferably conducted in a clean room.

The cured phenolic resin obtained above is as necessary ground for thickness adjustment, using a sand belt or the like. Then, the resulting material (the cured phenolic resin after grinding) is preferably heated to 200° C. in an oxidizing atmosphere in a sufficient period of time to give rise to complete curing of the phenolic resin and remove the solvent of the phenolic resin solution and the degas components such as the water formed during resin curing, both contained in the material, because said solvent and said degas components tend to remain in the cured phenolic resin particularly when it is thick and because the degas components, when evaporated violently in the firing step described later, gives rise to cracking of the thick cured phenolic resin.

Incidentally, the film of peroxidized phenolic resin formed on the surface of the cured phenolic resin is removed at the above grinding step.

When the application of the glassy carbon to be produced is beforehand known, the cured phenolic resin is preferably subjected to processing such as drilling, lapping or the like before being subjected to firing, to obtain a shape close to the intended final shape, because the glassy carbon produced after the firing step is difficult to process into a shape suitable for the application. The above processing conducted before the firing step is typified by drilling (e.g. making of gas-injecting hole) conducted to make, from the glassy carbon of the present invention, an electrode plate for plasma etching, or by coring conducted to make, from the present glassy carbon, a hard disc substrate having a donut disc shape. The processing is conducted in view of that the cured phenolic resin shrinks in the firing step, in other words, the hole formed in drilling shrinks in the firing step (for example, the cured phenolic resin shrinks to about 83% of the original size in the firing of 1,000° C.).

The cured phenolic resin, which has been subjected to the above processing as necessary, is finally fired and converted into a glassy carbon of the present invention. This firing step is conducted preferably in at least two stages as follows. First, the cured phenolic resin is heated to 1,000° C. in a non-oxidizing atmosphere at a temperature elevation rate of 2–20° C./hour to convert it into a glassy carbon green plate. A higher temperature elevation rate can be applied for a thinner cured phenolic resin. The temperature elevation rate, however, is preferably controlled carefully so that violent vaporization of thermal decomposition products does not take place.

Then, the glassy carbon green plate is heated to 1,200–2,000° C. in a non-oxidizing atmosphere at a temperature elevation rate of 5° C./min or less. At this final temperature, the thermal decomposition components remaining in the glassy carbon green plate and to be removed as degas components, particularly the residual hydrogen very harmful when the glassy carbon plate is used as a substrate for magnetic recording medium can be removed from the glassy carbon green plate.

The thus-obtained glassy carbon green plate may as necessary be converted into a glassy carbon shaped product, by subjecting to cutting or grinding for desired external shape, or by subjecting to lapping for warpage removing and final thickness, or by subjecting to grinding for desired surface roughness and no peeling.

To the glassy carbon green plate may further be applied, in combination, a cleaning step of removing the stains, impurities, etc. (e.g. oil and abrasive) adhering on the green plate, by the use of an appropriate cleaning solution or an ultrasonic wave, and a purification step of removing the impurities contained in or adhering on the glassy carbon green plate, by applying a halogen gas in an atmosphere of high temperature and reduced pressure.

INDUSTRIAL APPLICABILITY

The thus-obtained glassy carbon has a dense, homogeneous and amorphous structure, is free from very fine pores or low-density portions, has no defects on the surface and inside, and is high in strength and isotropical as a glassy carbon.

The glassy carbon of the present invention, when used as a substrate for magnetic recording medium, has no defects on the surface or no residual gas inside and can have a uniform magnetic recording layer formed thereon.

The glassy carbon of the present invention, when used as an electrode plate for plasma etching, has no defects on the surface or inside; therefore, scarcely gives rise to abnormal discharging not only at the start of the use but also during the use (i.e. consumption) and generates substantially no fine dust; consequently, enables fine processing of wafer at a high yield.

As described above, in order to minimize the water generated during the heat-curing of the phenolic resin and further to uniformly disperse the water in the glassy carbon to eliminate the bubbles derived from the water, the present invention has developed a means of balancing the gas removing (water removal and solvent removal) with the viscosity (hardness) increase of the phenolic resin solution during the heat-curing of the phenolic resin (the viscosity increase interrupts the gas removal); as a result, it has become possible to homogeneously heat-cure the phenolic resin so that no bubbles remain in the glassy carbon obtained; further, by firing the homogeneous cured resin, it has become to obtain a glassy carbon having no defects.

EXAMPLES

The present invention is hereinafter described in detail by way of Examples.

In the following Examples, viscosity was measured using a B type viscometer under the conditions of 25° C., a No. 2 rotor and 30 rpm.

Gelation time was determined in accordance with JIS K 6909 by placing 5 g of a resin solution on a hot plate kept at 150±1° C., continuously stirring the solution by the use of a metal spoon, and measuring a time up to when stirring became impossible.

Adhesivity of magnetic film was measured as follows in accordance with the X-cut tape test specified in JIS K 5400-1990. Two straight cut flaws each of 40 mm in length intersecting each other at an angle of 30° were formed in the magnetic film provided on a substrate, with a cutter knife so that the cuts reached the substrate. On the thus-formed X-shaped cuts were adhered a cellophane pressure-sensitive adhesive tape. By pulling one end of the tape, the tape was momentarily peeled in a direction vertical to the magnetic film. The condition of peeling of the X-shaped cut area was examined visually and rated according to the standard shown in Table 1.

TABLE 1

| Rating | Condition of X-shaped cut area |
| --- | --- |
| 10 | There is no peeling. |
| 8 | There is no peeling at the point of intersection of two cuts but there is slight peeling at the X-shaped cut area. |
| 6 | There is peeling of 1.5 m or less extending to any direction from the intersection of two cuts. |
| 4 | There is peeling of 3.0 m or less extending to any direction from the intersection of two cuts. |
| 2 | There is peeling at most of the X-shaped cut area. |
| 0 | There appears peeling larger than the X-shaped cut area. |

Example 1

A methanol solution containing 62% by weight of a resol type phenolic resin having a number-average molecular weight of 400 (the on had a viscosity of 250 cp at 25° C. and a gelation time of 115 seconds) was passed through a filter having a pore size of 3 µm, in a clean room. The resulting solution was cast into a PET laboratory in a 6-mm thickness, then heated to 85° C. in 30 hours, and kept at temperature for 10 hours. The resulting phenolic resin film released from the PET laboratory dish and then heat-cured at 90° C. for 5 hours and at 100° C. for 5 hours to obtain a cured phenolic resin film.

The cured phenolic resin film was lapped to a thickness of 2 mm by the use of a grinder, then cut into a ring having an outer diameter of 88 mm and an inner diameter of 10 mm by the use of an NC milling machine, and lapped to a thickness of 1.2 mm by the use of a CNC lathe.

The cured phenolic resin shaped material obtained above was heated to 1,000° C. at a temperature elevation rate of 18° C./hour and then finish-fired to 1,300° C. at a temperature elevation rate of 2° C./hour, in a non-oxidizing atmosphere in a firing furnace, to obtain a glassy carbon green plate.

The glassy carbon green plate was lapped into a ring having an outer diameter of 65 mm and an inner diameter of 20 mm by the use of a grinder, then processed so as to have a flatness of 2 µm and a thickness of 640 µm by the use of a lapping machine, and subjected to a finishing operation by the use of a grinding machine so as to have a surface roughness (Ra) of 1 nm or less, a maximum surface roughness (Rmax) of 10 nm or less and a roll-off of 15 nm or less, whereby a hard disc substrate made of glassy carbon was obtained.

On the hard disc substrate was formed, by the use of a magnetron sputtering apparatus (L-430S manufactured by Anelva Corp.), a Cr layer of 1,000 Å, a Co—Cr layer of 500 Å and a carbon layer of 200 Å in this order. The resulting material was observed by the use of a SEM. Also, the adhesivity of the film formed on the hard disc substrate was measured in accordance with the X-cut tape test.

The hard disc substrate had no surface defects such as peeling, pores and the like, had a bending strength of 17 kg/mm$^2$ and a density of 1.58 g/cm$^3$, and contained no residual hydrogen inside; therefore, no gas generation occurred during the film formation on the substrate, and a uniform magnetic film of high adhesivity and high coercive force could be formed on the substrate. The results are shown in Table 2.

Example 2

A hard disc substrate having no surface defects such as peeling, pores and the like, a bending strength of 17 kg/mm$^2$ and a density of 1.58 g/cm$^3$ and containing no residual hydrogen inside was obtained in the same manner as in Example 1 except that there was used a methanol solution containing 45% by weight of a resol type phenolic resin having a molecular weight of 460 (the solution had a viscosity of 240 cp at 25° C. and a gelation time of 100 seconds). On this hard disc substrate could be formed a uniform magnetic film of high adhesivity and high coercive force. The results are shown in Table 2.

Example 3

A hard disc substrate having no surface defects such as peeling, pores and the like, a bending strength of 17 kg/mm$^2$ and a density of 1.58 g/cm$^3$ and containing no residual hydrogen inside was obtained in the same manner as in Example 1 except that there was used a methanol solution containing 75% by weight of a resol type phenolic resin having a molecular weight of 320 (the solution had a viscosity of 240 cp at 25° C. and a gelation time of 135 seconds). On this hard disc substrate could be formed a uniform magnetic film of high adhesivity and high coercive force. The results are shown in Table 2.

Example 4

A hard disc substrate having no surface defects such as peeling, pores and the like, a bending strength of 17 kg/mm$^2$ and a density of 1.58 g/cm$^3$ and containing no residual hydrogen inside was obtained in the same manner as in Example 1 except that there was used an ethanol solution containing 62% by weight of a resol type phenolic resin having a molecular weight of 400 (the solution had a viscosity of 265 cp at 25° C. and a gelation time of 110 seconds). On this hard disc substrate could be formed a uniform magnetic film of high adhesivity and high coercive force. The results are shown in Table 2.

Example 5

A hard disc substrate having no surface defects such as peeling, pores and the like, a bending strength of 17 kg/mm$^2$ and a density of 1.58 g/cm$^3$ and containing no residual hydrogen inside was obtained in the same manner as in Example 1 except that there was used an isopropyl alcohol solution containing 62% by weight of a resol type phenolic resin having a molecular weight of 400 (the solution had a viscosity of 255 cp at 25° C. and a gelation time of 115 seconds). On this hard disc substrate could be formed a uniform magnetic film of high adhesivity and high coercive force. The results are shown in Table 2.

Example 6

A hard disc substrate having no surface defects such as peeling, pores and the like, a bending strength of 16 kg/mm$^2$ and a density of 1.57 g/cm$^3$ and containing no residual hydrogen inside was obtained in the same manner as in Example 1 except that the heat-curing of the methanol solution of phenolic resin was conducted by heating to 90° C. in 20 hours, keeping at that temperature for 15 hours, and heating at 100° C. for 5 hours. On this hard disc substrate could be formed a uniform magnetic film of high adhesivity and high coercive force. The results are shown in Table 2.

Example 7

A hard disc substrate having no surface defects such as peeling, pores and the like, a bending strength of 16 kg/mm$^2$ and a density of 1.57 g/cm$^3$ and containing no residual hydrogen inside was obtained in the same manner as in Example 1 except that the cured resin shaped material was finish-fired at 1,200° C. On this hard disc substrate could be formed a uniform magnetic film of high adhesivity and high coercive force. The results are shown in Table 2.

Example 8

A hard disc substrate having no surface defects such as peeling, pores and the like, a bending strength of 16 kg/mm$^2$ and a density of 1.57 g/cm$^3$ and containing no residual hydrogen inside was obtained in the same manner as in Example 1 except that the cured resin shaped material was finish-fired at 1,500° C. On this hard disc substrate could be formed a uniform magnetic film of high adhesivity and high coercive force. The results are shown in Table 2.

Example 9

A hard disc substrate having no surface defects such as peeling, pores and the like, a bending strength of 16 kg/mm$^2$ and a density of 1.56 g/cm$^3$ and containing no residual hydrogen inside was obtained in the same manner as in Example 1 except that the cured resin shaped material was finish-fired at 1,600° C. On this hard disc substrate could be formed a uniform magnetic film of high adhesivity and high coercive force. The results are shown in Table 2.

TABLE 2

| | Number-average molecular weight of phenolic resin | Resin concentration in solution (wt %)/ solvent | Viscosity (cp) | Gelation time (sec) | Curing temperature of phenolic resin (° C.)/time kept at this temperature (hr) | | Firing temperature (° C.)/ Temperature elevation rate (° C./hr) | | Bending strength (kgg/mm$^2$) | Density (g/cm$^3$) | Adhesivity of megnetic film | Magnetic coercive force (Oe) |
|---|---|---|---|---|---|---|---|---|---|---|---|---|
| Example 1 | 400 | 62/MeOH | 250 | 115 | 1st 2nd 3rd | 85/10 90/5 100/5 | 1st 2nd | 1000/18 2000/2 | 17 | 1.58 | 10 | 2300 |
| Example 2 | 460 | 45/MeOH | 240 | 100 | ↑ | | ↑ | | 17 | 1.58 | 10 | 2250 |
| Example 3 | 320 | 75/MeOH | 240 | 135 | ↑ | | ↑ | | 17 | 1.58 | 10 | 2350 |
| Example 4 | 400 | 62/EtOH | 265 | 110 | ↑ | | ↑ | | 17 | 1.58 | 10 | 2350 |
| Example 5 | 400 | 62/IPA | 255 | 115 | ↑ | | ↑ | | 17 | 1.58 | 10 | 2400 |
| Example 6 | 400 | 62/MeOH | 250 | 115 | 1st 2nd | 90/15 100/5 | ↑ | | 16 | 1.57 | 10 | 2250 |
| Example 7 | 400 | 62/MeOH | 250 | 115 | 1st 2nd 3rd | 85/10 90/5 100/5 | 1st 2nd | 1000/18 1200/2 | 16 | 1.57 | 10 | 2300 |
| Example 8 | 400 | 62/MeOH | 250 | 115 | ↑ | | 1st 2nd | 1000/18 1500/2 | 16 | 1.57 | 10 | 2350 |
| Example 9 | 400 | 62/MeOH | 250 | 115 | ↑ | | 1st 2nd | 1000/18 1600/2 | 16 | 1.57 | 10 | 2200 |

Comparative Example 1

A hard disc substrate made of carbon was obtained in the same manner as in Example 1 except that there was used a methanol solution containing 85% by weight of a resol type phenolic resin having a number-average molecular weight of 250 (the solution had a viscosity of 400 cp at 25° C. and a gelation time of 600 seconds). Then, a thin film was formed thereon in the same manner as in Example 1. The carbon substrate had about 1,000 surface defects of about 0.2 mm, a low strength (a bending strength of 10 kg/mm$^2$ and a density of 1.47 g/cm$^3$) and a low magnetic coercive force of 1,250 Oe. The results of other measurements are shown in Table 3.

Comparative Example 2

A hard disc substrate made of carbon was obtained in the same manner as in Example 1 except that there was used a methanol solution containing 35% by weight of a resol type phenolic resin having a number-average molecular weight of 600 (the solution had a viscosity of 450 cp at 25° C. and a gelation time of 60 seconds). Then, a thin film was formed thereon in the same manner as in Example 1. The carbon substrate had an innumerable number of surface defects of about 0.5 mm, a low strength (a bending strength of 8 kg/mm² and a density of 1.42 g/cm³) and a magnetic coercive force too low to measure. The results of other measurements are shown in Table 3.

Comparative Example 3

A hard disc substrate made of carbon was produced in the same manner as in Example 1 except that the firing temperature was changed to 1,000° C. The substrate was placed in a vacuum chamber in order to conduct sputtering to form a magnetic thin film on the substrate. However, sufficient vacuum could not be obtained because severe vaporization took place. The carbon substrate had no surface defects such as peeling, pores and the like, a bending strength of 15 kg/mm², a density of 1.57 g/cm³ and a low magnetic coercive force of 800 Oe. The results of other measurements are shown in Table 3.

Comparative Example 4

A hard disc substrate made of carbon was produced in the same manner as in Example 1 except that the firing temperature was changed to 3,000° C. The carbon substrate had about 200 surface defects of about 0.2 mm, a low strength (a bending strength of 12 kg/mm² and a density of 1.25 g/cm³) and a low magnetic coercive force of 800 Oe. The results of other measurements are shown in Table 3.

Comparative Example 5

The same resin solution as used in Example 1 was used. No heat-curing from 85° C. to 100° C. was conducted and firing was conducted at 1,300° C. As a result, the shape of resin green plate was lost; bubbles generated; and no carbon plate was obtainable.

Comparative Example 6

The same resin solution as used in Example 1 was used. Heat-curing after casting was conducted at 250° C. for 10 hours. The condition after the heat-curing was observed, which indicated generation of large number of bubbles. Therefore, no firing step could be conducted.

TABLE 3

| | Number-average molecular weight of phenolic resin | Resin concentration in solution (wt %)/solvent | Viscosity (cp) | Gelation time (sec) | Curing temperature of phenolic resin (° C.)/time kept at this temperature (hr) | | Firing temperature (° C.)/Temperature elevation rate (° C./hr) | | Bending strength (kgg/mm²) | Density (g/cm³) | Adhesivity of megnetic film | Magnetic coercive force (Oe) |
|---|---|---|---|---|---|---|---|---|---|---|---|---|
| Comparative Example 1 | 250 | 85 | 400 | 600 | 1st 2nd 3rd | 85/10 90/5 100/5 | 1st 2nd | 1000/18 2000/2 | 10 | 1.47 | 4 | 1250 |
| Comparative Example 2 | 600 | 35 | 450 | 60 | ↑ | | ↑ | | 8 | 1.42 | 4 | <800 |
| Comparative Example 3 | 400 | 62/MeOH | 250 | 115 | 1st 2nd 3rd | 85/10 90/5 100/5 | 1st 1250 | 1000/18 | 10 | 1.57 | 6 | 800 |
| Comparative Example 4 | 400 | 62/MeOH | 250 | 115 | 1st 2nd 3rd | 85/10 90/5 100/5 | 1st | 3000/18 | 12 | 1.25 | 6 | 800 |

Example 10

A methanol solution containing 62% by weight of a resol type phenolic resin having a number-average molecular weight of 400 (the solution had a viscosity of 260 cp at 25° C. and a gelation time of 115 seconds) was passed through a filter having a pore size of 3 μm, in a clean room. The resulting solution was cast into a PET laboratory dish in a 7-mm thickness, then heated to 85° C. in 30 hours, and kept at that temperature for 10 hours. The resulting phenolic resin film was released from the PET laboratory dish and then heat-cured at 90° C. for 5 hours and at 100° C. for 5 hours to obtain a resin green plate.

The resin green plate was lapped into a thickness of 6.7 mm by the use of a grinder, then heated from 100° C. to 200° C. in 70 hours to completely cure the resin green plate, and lapped to a thickness of 6.0 mm by the use of a grinder. In the central area of the resulting disc-shaped resin green plate were formed 519 holes.

The shaped resin green plate obtained above was heated to 1,000° C. at a temperature elevation rate of 3° C./hour and further finish-fired to 2,000° C. at a temperature elevation temperature of 2° C./hour, in a non-oxidizing atmosphere in a firing furnace, whereby a glassy carbon green plate was obtained.

The glassy carbon green plate was lapped into a disc having an outer diameter of 280 mm by the use of a grinder, and the disc was processed so as to have a flatness of 10 μm and a thickness of 4.00 mm by the use of a lapping machine. A spot facing was formed at the periphery of the resulting disc by the use of a machining center; then, the disc was subjected to a surface finish by the use of a grinding machine so as to have a Ra of 0.01 μm or less and a Rmax of 0.1 μm or less; thereafter, a halogen gas was implanted into the disc at 2,000° C. or below in a purification kilin to purify the disc and obtain an electrode plate for plasma etching.

The electrode plate for plasma etching had no surface defects such as peeling, pores and the like, a bending strength of 16 kg/mm² and a density of 1.57 g/cm³.

The electrode plate for plasma etching was mounted on a plasma etching apparatus of parallel plate type as an upper electrode plate. Oxide film etching of silicon wafer was conducted by passing $CF_4$, $CHF_3$ (reactive gases) and argon (carrier gas) at rates of 20/20/400 sccm, respectively, and employing a chamber pressure of 350 mTorr and an electric power of 800 w. Discharging was conducted for 60 seconds per one wafer, and the number of the dust of 0.25 μm or larger remaining on each wafer was measured by the use of an optical counter. Also, the surface of the electrode after use was measured by an SEM, which indicated that the electrode plate for plasma etching had no surface defects and was very smooth. The results of measurement are shown in Table 4.

Example 11

An electrode plate for plasma etching having no surface defects such as peeling, pores and the like, a bending strength of 17 kg/mm$^2$ and a density of 1.58 g/cm$^3$ was obtained in the same manner as in Example 10 except that there was used a methanol solution containing 45% by weight of a resol type phenolic resin having a molecular weight of 460 (the solution had a viscosity of 240 cp at 25° C. and a gelation time of 100 seconds). When this electrode plate for plasma etching was used for plasma etching, the dust generated was small in amount and very fine in size. The results of measurement are shown in Table 4.

Example 12

An electrode plate for plasma etching having no surface defects such as peeling, pores and the like, containing no residual hydrogen inside, and having a bending strength of 17 kg/mm$^2$ and a density of 1.58 g/cm$^3$ was obtained in the same manner as in Example 10 except that there was used a methanol solution containing 75% by weight of a resol type phenolic resin having a molecular weight of 320 (the solution had a viscosity of 240 cp at 25° C. and a gelation time of 135 seconds). When this electrode plate for plasma etching was used for plasma etching, the dust generated was small in amount and very fine in size. The results of measurement are shown in Table 4.

Example 13

An electrode plate for plasma etching having no surface defects such as peeling, pores and the like, containing no residual hydrogen inside, and having a bending strength of 17 kg/mm$^2$ and a density of 1.58 g/cm$^3$ was obtained in the same manner as in Example 10 except that there was used an ethanol solution containing 62% by weight of a resol type phenolic resin having a molecular weight of 400 (the solution had a viscosity of 265 cp at 25° C. and a gelation time of 110 seconds). When this electrode plate for plasma etching was used for plasma etching, the dust generated was small in amount and very fine in size. The results of measurement are shown in Table 4.

Example 14

An electrode plate for plasma etching having no surface defects such as peeling, pores and the like, containing no residual hydrogen inside, and having a bending strength of 17 kg/mm$^2$ and a density of 1.58 g/cm$^3$ was obtained in the same manner as in Example 10 except that there was used an isopropyl alcohol solution containing 62% by weight of a resol type phenolic resin having a molecular weight of 400 (the solution had a viscosity of 255 cp at 25° C. and a gelation time of 115 seconds). When this electrode plate for plasma etching was used for plasma etching, the dust generated was small in amount and very fine in size. The results of measurement are shown in Table 4.

Example 15

An electrode plate for plasma etching having no surface defects such as peeling, pores and the like, containing no residual hydrogen inside, and having a bending strength of 16 kg/mm$^2$ and a density of 1.57 g/cm$^3$ was obtained in the same manner as in Example 10 except that the heat-curing of the methanol solution of phenolic resin was conducted by heating to 90° C. in 20 hours, keeping at that temperature for 15 hours, and heating at 100° C. for 5 hours. When this electrode plate for plasma etching was used for plasma etching, the dust generated was small in amount and very fine in size. The results of measurement are shown in Table 4.

Example 16

An electrode plate for plasma etching having no surface defects such as peeling, pores and the like, containing no residual hydrogen inside, and having a bending strength of 16 kg/mm$^2$ and a density of 1.56 g/cm$^3$ was obtained in the same manner as in Example 10 except that the finish-firing of the shaped resin green plate was conducted at 1,600° C. When this electrode plate for plasma etching was used for plasma etching, the dust generated was small in amount and very fine in size. The results of measurement are shown in Table 4.

Example 17

An electrode plate for plasma etching having no surface defects such as peeling, pores and the like, containing no residual hydrogen inside, and having a bending strength of 16 kg/mm$^2$ and a density of 1.56 g/cm$^3$ was obtained in the same manner as in Example 10 except that the finish-firing of the shaped resin green plate was conducted at 1,800° C. When this electrode plate for plasma etching was used for plasma etching, the dust generated was small in amount and very fine in size. The results of measurement are shown in Table 4.

Comparative Example 7

An electrode plate for plasma etching having slight surface defects, a bending strength of 16 kg/mm$^2$ and a density of 1.55 g/cm$^3$ was obtained in the same manner as in Example 10 except that there was used a methanol solution containing 60% by weight of a resol type phenolic resin having a molecular weight of 200 (the solution had a viscosity of 100 cp at 25° C. and a gelation time of 250 seconds). When this electrode plate for plasma etching was used for plasma etching, the dust generated was relatively large in amount. The results of measurement are shown in Table 4.

Comparative Example 8

An electrode plate for plasma etching having bubble-like face defects, a bending strength of 15 kg/mm$^2$ and a density of 1.54 g/cm$^3$ was obtained in the same manner as in Example 10 except that there was used a methanol solution containing 55% by weight of a resol type phenolic resin having a molecular weight of 550 (the solution had a viscosity of 2,000 cp at 25° C. and a gelation time of 40 seconds). When this electrode plate for plasma etching was used for plasma etching, the dust generated was large in amount. The results of measurement are shown in Table 4.

TABLE 4

| | Number of foreign matter | | | |
| --- | --- | --- | --- | --- |
| | Min. | Max. | Average (n = 10) | SEM observation |
| Example 10 | 0 | 3 | 1.2 | Smooth |
| Example 11 | 0 | 3 | 1.5 | Smooth |
| Example 12 | 0 | 5 | 1.8 | Smooth |
| Example 13 | 1 | 2 | 1.5 | Smooth |
| Example 14 | 0 | 2 | 1.0 | Smooth |
| Example 15 | 0 | 2 | 0.8 | Smooth |
| Example 16 | 0 | 5 | 1.5 | Smooth |
| Example 17 | 0 | 2 | 1.0 | Smooth |
| Comparative Example 7 | 8 | 18 | 13.5 | slight defects |
| Comparative Example 8 | 12 | 55 | 33.0 | Defects |

What is claimed is:

1. A glassy carbon having no pores obtained by heat-curing a phenolic resin and firing the cured-phenolic resin in a non-oxidizing atmosphere, wherein the phenolic resin has a number-average molecular weight of 300–500 and is in the form of a solution of the phenolic resin dissolved in an hydrophilic organic solvent having a concentration of 40–80% by weight and a viscosity of 200–300 cp at 25° C.

2. A glassy carbon according to claim 1, wherein the hydrophilic organic solvent is an alcohol.

3. A glassy carbon according to claim 2, wherein the alcohol is at least one alcohol selected from the group consisting of methyl alcohol, ethyl alcohol, propyl alcohol and butyl alcohol.

4. A glassy carbon according to claim 1, wherein the phenolic resin solution has a gelation time of 80–150 seconds.

5. A glassy carbon according to claim 1, wherein the curing temperature is 50–200° C.

6. A glassy carbon according to claim 1, wherein the firing temperature is 1,200–2,000° C.

7. A substrate for magnetic recording medium, made of a glassy carbon according to claim 1.

8. An electrode plate for plasma etching, made of a glassy carbon according to claim 1.

9. A process for producing a glassy carbon, which comprises heat-curing a phenolic resin and firing the cured-phenolic resin in a non-oxidizing atmosphere, wherein the phenolic resin has a number-average molecular weight of 300–500 and is in the form of a solution of the phenolic resin dissolved in an hydrophilic organic solvent having a concentration of 40–80% by weight.

10. A process for producing a glassy carbon according to claim 9, wherein the hydrophilic organic solvent is an alcohol.

11. A process for producing a glassy carbon according to claim 10, wherein the alcohol is at least one alcohol selected from the group consisting of methyl alcohol, ethyl alcohol, propyl alcohol and butyl alcohol.

12. A process for producing a glassy carbon according to claim 9, wherein the phenolic resin solution has a viscosity of 200–300 cp at 25° C.

13. A process for producing a glassy carbon according to claim 9, wherein the phenolic resin solution has a gelation time of 80–150 seconds.

14. A process for producing a glassy carbon according to claim 9, wherein the curing temperature is 50–200° C.

15. A process for producing a glassy carbon according to claim 9, wherein the firing temperature is 1,200–2,000° C.

16. A process for producing a glassy carbon according to claim 9, wherein the glassy carbon produced has no pores.

17. A process for producing a glassy carbon according to claim 9, which comprises molding the cured-phenolic resin into a desired shape prior to the firing.

18. A process for producing a glassy carbon according to claim 9, wherein firing of the cured-phenolic resin is conducted by heating the cured-phenolic resin to 1000° C. at a temperature elevation rate of 2–20° C./hour to convert it into a glassy carbon green plate which is then heated to 1,200–2,000° C. at a temperature elevation rate of 5° C./min or less.

* * * * *